United States Patent
Friedman

(10) Patent No.: US 8,333,433 B2
(45) Date of Patent: Dec. 18, 2012

(54) LOCKING HARNESS APPARATUS AND METHOD

(76) Inventor: Mark J. Friedman, Niskayuna, NY (US)

( * ) Notice: Subject to any disclaimer, the term of this patent is extended or adjusted under 35 U.S.C. 154(b) by 335 days.

(21) Appl. No.: 12/703,227

(22) Filed: Feb. 10, 2010

(65) Prior Publication Data

US 2011/0193396 A1  Aug. 11, 2011

(51) Int. Cl.
  *A47D 15/00* (2006.01)
  *A44B 11/06* (2006.01)
(52) U.S. Cl. ............... 297/482; 24/615; 24/DIG. 38
(58) Field of Classification Search ........... 297/484, 297/479, 482; 24/615, 198, 200, DIG. 38, 24/DIG. 42, 589.1, 196
  See application file for complete search history.

(56) References Cited

U.S. PATENT DOCUMENTS

| | | | | |
|---|---|---|---|---|
| 594,006 A * | 11/1897 | Gorton | | 24/184 |
| 2,084,412 A * | 6/1937 | Schaefer | | 24/186 |
| 2,228,379 A * | 1/1941 | Woodard | | 24/321 |
| 2,403,712 A * | 7/1946 | Elwell | | 24/320 |
| 3,649,076 A * | 3/1972 | Blake | | 297/479 |
| 3,672,004 A * | 6/1972 | Smith | | 24/302 |
| 3,872,197 A * | 3/1975 | Kato et al. | | 264/40.7 |
| 3,988,098 A * | 10/1976 | Kato et al. | | 425/224 |
| 4,323,204 A * | 4/1982 | Takada | | 242/381.4 |
| 4,491,343 A * | 1/1985 | Fohl | | 280/801.1 |
| 4,492,348 A * | 1/1985 | Ziv et al. | | 242/381.1 |
| 4,554,779 A * | 11/1985 | Fischer | | 53/589 |
| 4,569,106 A * | 2/1986 | Lovato | | 24/615 |
| 4,800,629 A * | 1/1989 | Ikeda | | 24/170 |
| 4,810,036 A * | 3/1989 | Buser | | 297/464 |
| 4,973,083 A | 11/1990 | Richards et al. | | |
| 5,029,896 A * | 7/1991 | Ernst | | 280/806 |
| 5,037,135 A * | 8/1991 | Kotikovsky et al. | | 280/808 |
| 5,669,118 A * | 9/1997 | Frano et al. | | 24/265 AL |
| 5,735,024 A | 4/1998 | Ortiz | | |
| 5,839,793 A * | 11/1998 | Merrick et al. | | 297/484 |
| 5,852,852 A * | 12/1998 | Rigal | | 24/68 R |
| 5,873,635 A * | 2/1999 | Merrick | | 297/484 |
| 6,079,662 A * | 6/2000 | Miller et al. | | 242/571.2 |
| 6,220,662 B1 | 4/2001 | Franco-Vila et al. | | |
| 6,367,882 B1 * | 4/2002 | Van Druff et al. | | 297/484 |
| 6,447,060 B1 * | 9/2002 | Vila et al. | | 297/256.13 |
| 6,543,097 B2 * | 4/2003 | Burt et al. | | 24/170 |
| 6,662,413 B2 | 12/2003 | Glover | | |
| 6,824,222 B2 * | 11/2004 | Maloney et al. | | 297/478 |

(Continued)

FOREIGN PATENT DOCUMENTS

JP 2008105552 A * 5/2008

*Primary Examiner* — David Dunn
*Assistant Examiner* — David E Allred
(74) *Attorney, Agent, or Firm* — Schmeiser, Olsen & Watts; Mark J. Friedman

(57) ABSTRACT

A harness apparatus including a first adjustable harness strap, a second adjustable harness strap, and a retainer apparatus. The retainer apparatus includes a first retainer portion slidably attached to the first harness strap, a second retainer portion slidably attached to the second harness strap, and a braking mechanism configured to prevent the first retainer portion and the second retainer portion from moving along the first harness strap and the second harness strap. The first retainer portion is removably attached to the second retainer portion. The braking mechanism includes a braking device configured to apply resistance to the first harness strap and/or the second harness strap and to hold the retainer apparatus in a stationary position along the first harness strap and the second harness strap.

19 Claims, 7 Drawing Sheets

U.S. PATENT DOCUMENTS

| | | | |
|---|---|---|---|
| 7,367,092 B1* | 5/2008 | Dilday | 24/615 |
| 7,445,293 B2 | 11/2008 | Smith et al. | |
| 7,964,130 B2* | 6/2011 | You | 264/254 |
| 8,262,133 B2* | 9/2012 | Usoro et al. | 280/806 |
| 2002/0029443 A1* | 3/2002 | Ortiz | 24/615 |
| 2005/0091808 A1* | 5/2005 | Uehara et al. | 24/615 |
| 2006/0289575 A1* | 12/2006 | Chou | 224/264 |
| 2007/0102989 A1 | 5/2007 | Smith et al. | |
| 2007/0102990 A1* | 5/2007 | Smith et al. | 297/484 |
| 2007/0193004 A1* | 8/2007 | Chou | 24/170 |
| 2007/0283540 A1* | 12/2007 | Chang | 24/68 CD |
| 2010/0244543 A1* | 9/2010 | Fine et al. | 297/484 |

* cited by examiner

LOCKING HARNESS APPARATUS AND METHOD

FIELD OF THE INVENTION

The present invention relates to a locking restraint apparatus and associated method for restraining an individual in a vehicle for preventing motion related injuries.

BACKGROUND OF THE INVENTION

Restraining users during travel typically comprises an inefficient process with little flexibility. Accordingly, there exists a need in the art to overcome at least some of the deficiencies and limitations described herein above.

SUMMARY OF THE INVENTION

The present invention provides a harness apparatus comprising:
  a first adjustable harness strap;
  a second adjustable harness strap; and
  a first retainer apparatus comprising a first retainer portion slidably attached to said first harness strap, a second retainer portion slidably attached to said second harness strap, and a braking mechanism configured to prevent said first retainer portion and said second retainer portion from moving along said first harness strap and said second harness strap, wherein said first retainer portion is removably attached to said second retainer portion, and wherein said braking mechanism comprises a braking device configured to apply resistance to said first harness strap and/or said second harness strap and to hold said first retainer apparatus in a first stationary position along said first harness strap and said second harness strap.

The present invention provides a method for using a harness apparatus, comprising:
  providing said harness apparatus comprising a first adjustable harness strap, a second adjustable harness strap, and a first retainer apparatus comprising a first retainer portion slidably attached to said first harness strap, a second retainer portion slidably attached to said second harness strap, and a braking mechanism, wherein said first retainer portion is removably attached to said second retainer portion, and wherein said braking mechanism comprises a braking device;
  slidably moving said first retainer apparatus along said first harness strap and said second harness strap;
  stopping said slidably moving said first retainer apparatus at a specified location along said first harness strap and said second harness strap;
  enabling said braking mechanism; and
  applying, by said braking device in response to said enabling, resistance to said first harness strap and said second harness strap for holding said first retainer apparatus in a stationary position at said specified location along said first harness strap and said second harness strap.

The present invention advantageously provides a simple apparatus and associated method capable of restraining users during travel.

DETAILED DESCRIPTION OF THE INVENTION

Figure 1:
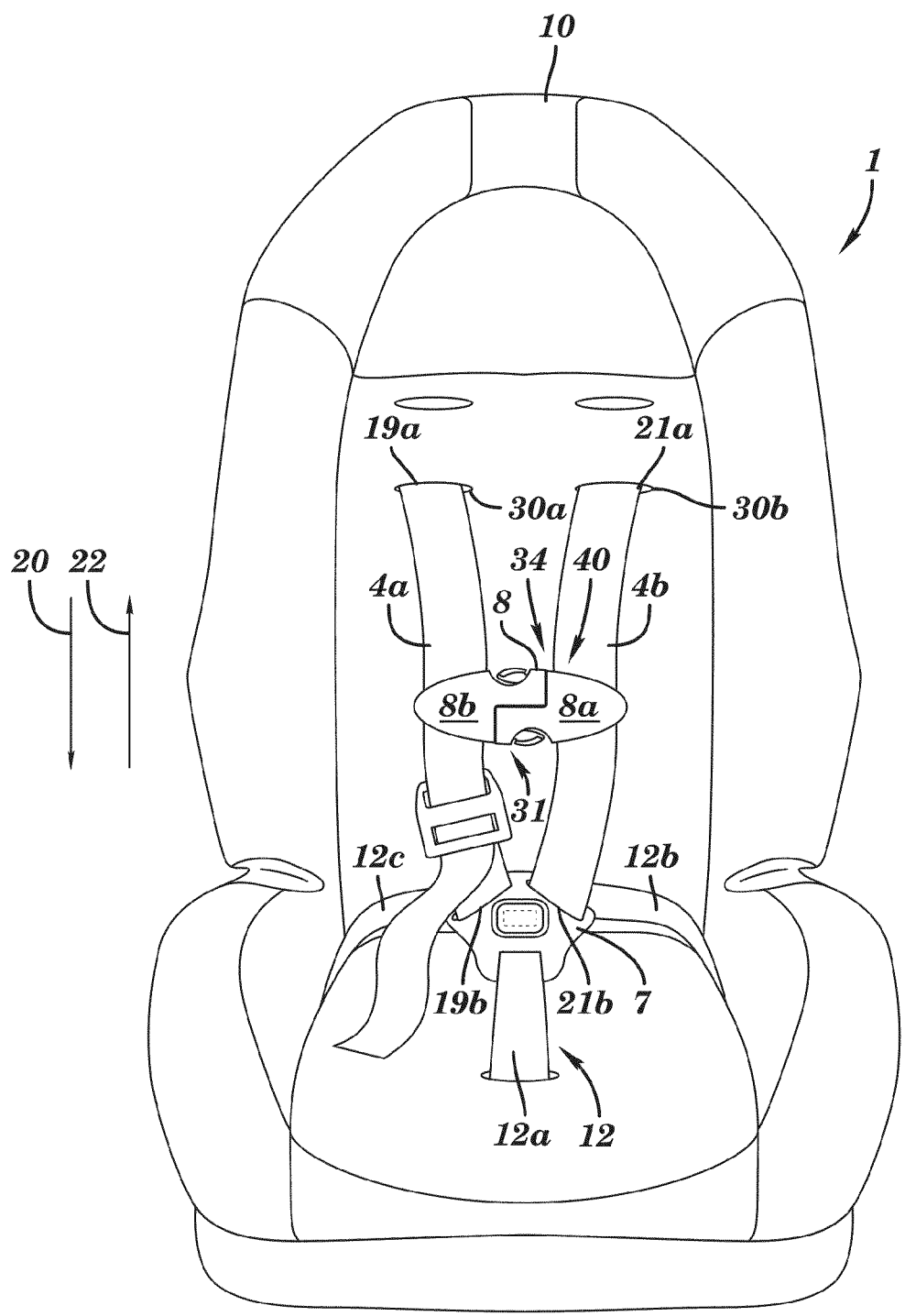
FIG. 1 illustrates a locking restraint apparatus for safely restraining an individual during travel in a vehicle, in accordance with embodiments of the present invention.
Figure 3:
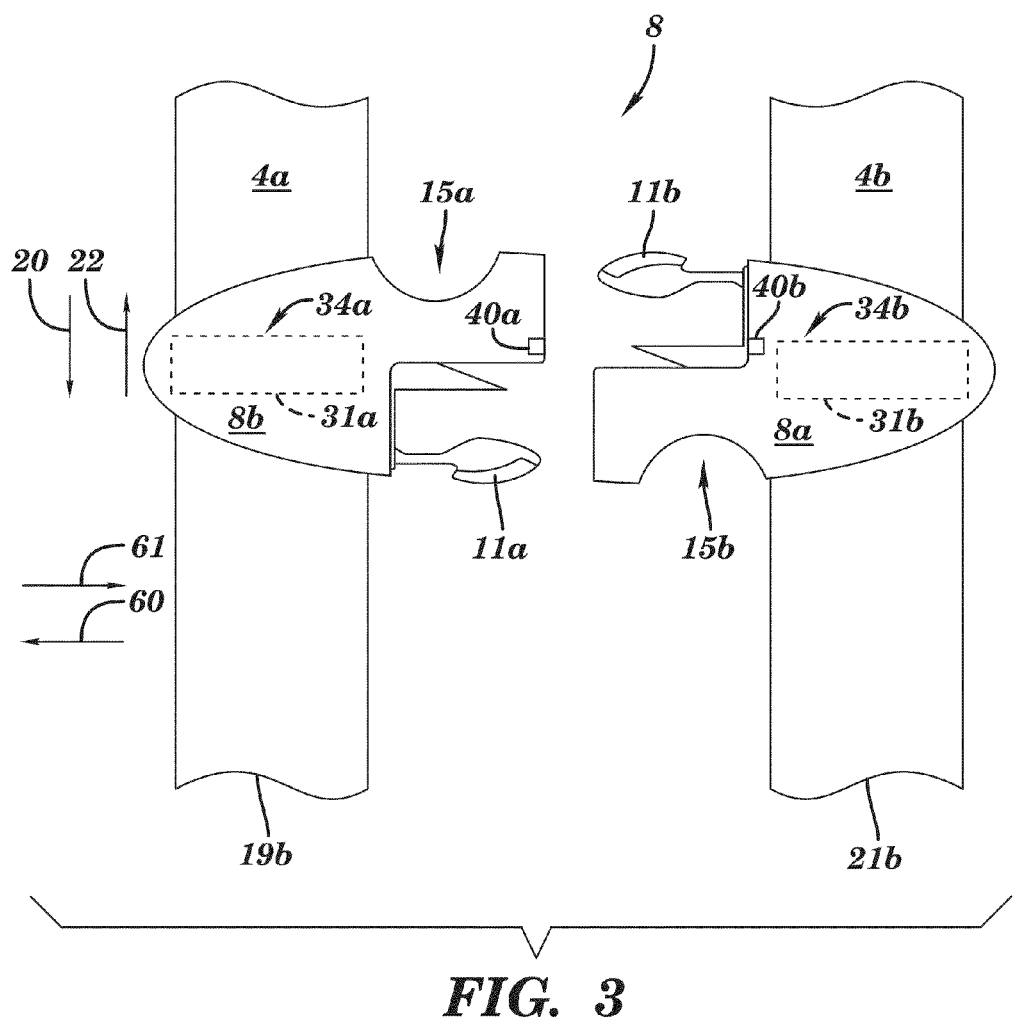
FIG. 3 illustrates a close up view of the retainer apparatus 8 of FIG. 1 slidably attached to adjustable harness straps, in accordance with embodiments of the present invention.
Figure 4A:
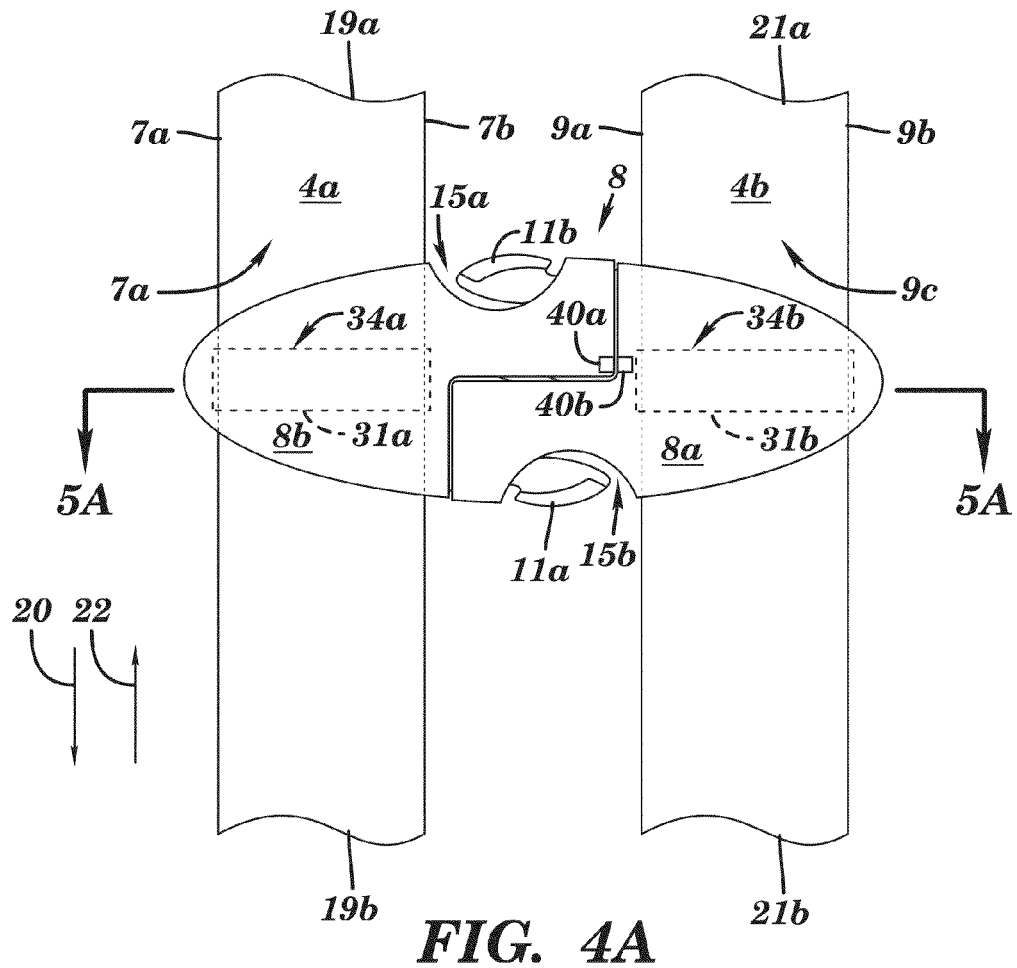
FIG. 4A illustrates an alternative to FIG. 3, in accordance with embodiments of the present invention.

FIG. 1 illustrates a restraint apparatus 1 for safely restraining an individual (e.g., a person) during travel in a vehicle, in accordance with embodiments of the present invention. Restraint apparatus 1 may be used in any type of vehicle including, inter alia, an automobile, an aircraft, a boat, etc. Restraint apparatus 1 comprises a seat structure 10 (e.g., a car seat), an adjustable harness strap 4a, an adjustable harness strap 4b, a retainer apparatus 8 slidably attached to adjustable harness strap 4a and adjustable harness strap 4b, and a harness portion 12. Adjustable harness strap 4a and adjustable harness strap 4b are configured to restrain an upper body portion of a person (e.g., see upper body portion 17a child 14 in FIG. 2, infra). An upper body portion (e.g., upper body portion 17a in FIG. 2) is defined herein as any portion of a body located above (i.e., in direction 20) a waist section (e.g., see waist section 17 in FIG. 2, infra). Adjustable harness strap 4a is removably attached to seat structure 10. Adjustable harness strap 4a extends from seat structure 10 through opening 30a to buckle structure 7. Adjustable harness strap 4a is removably attached to buckle structure 7. Adjustable harness strap 4b is removably attached to seat structure 10. Adjustable harness strap 4b extends from seat structure 10 through opening 30b to buckle structure 7. Adjustable harness strap 4b is removably attached to buckle structure 7. Retainer apparatus 8 comprises a retainer portion 8a, a retainer portion 8b, a braking mechanism 31, an optional motion detector/sensor/alarm apparatus 40, and an optional electrical motor/signal receiving device 34. Retainer portion 8a is slidably attached to harness strap 4a. Retainer portion 8b is slidably attached to harness strap 4b. Retainer apparatus 8 is configured to slidably move along harness strap 4a and harness strap 4b in a direction 20 and 22 and between ends 19a and 19b of harness strap 4a and ends 21a and 21b of harness strap 4b. Braking mechanism 31 is configured to adjustably prevent retainer portion 8a and retainer portion 8b from slidably moving along 4a harness strap and harness strap 4b. Braking mechanism 31 is configured to hold retainer portion 8a and retainer portion 8b at any stationary position along harness strap 4a and harness strap 4b. Braking mechanism 31 is configured to hold retainer portion 8a at any stationary position between portion 19a and portion 19b of harness strap 4a. Braking mechanism 31 is configured to hold retainer portion 8b at any stationary position between portion 21a and portion 21b of harness strap 4b. Retainer portion 8a is removably attached to retainer portion 8b (e.g., using clips 11a and 11b removably attached to openings 15a and 15b respectively as illustrated in FIGS. 3 and 4A, infra). Braking mechanism 31 comprises a braking device(s) (e.g. devices 37a, 37b, 38a, and 38b in FIG. 4B as described, infra) for applying resistance to harness strap 4a and/or harness strap 4b for holding retainer apparatus 8 in any stationary position along harness strap 4a and harness strap 4b. Optional electrical motor/signal receiving device 34 may comprise a signal receiving/transmitting device (e.g., a wireless transceiver) and/or an electrical motor or solenoid. Optional electrical motor/signal receiving device 34 is configured to accept a control signal (i.e., via a signal receiving/transmitting device) from a control device (e.g., a computer/controller in a vehicle) and automatically (e.g., in accordance with the control signal enabled by a user) slidably move (i.e., using an electrical motor) retainer apparatus 8 along harness strap 4a and harness strap 4b in direction 20 and/or 22 until a disable control signal is received by the signal receiving/transmitting device. Alternatively, optional electrical motor/signal receiving device 34 may be configured to accept a control signal (i.e., via a signal receiving/transmitting device) from a control device (e.g., a computer/controller in a vehicle) and automatically (e.g., in accordance with the control signal enabled by a user) slidably move (i.e., using an electrical motor) retainer apparatus 8 along harness strap 4a and harness strap 4b (i.e., in direction 20 and/or 22) a predetermined or specified distance (e.g., data comprising specified distances may be stored within a memory structure located within retainer apparatus 8 and/or a computer/controller in a vehicle). Optional motion detector sensor/alarm apparatus 40 may comprise a motion detector and/or an alarm. The motion detector detects any movement of retainer apparatus 8 (e.g., in direction 20 or 22, retainer portion 8a disconnected from retainer portion 8b, etc) and either activates a warning alarm located within sensor/alarm apparatus 40 or transmits a warning signal to a computer/controller in a vehicle to warn a user (e.g., a driver) that movement of retainer apparatus 8 has been detected thereby allowing the user to re-secure an individual (e.g., a child) in restraint apparatus 1. Harness portion 12 comprises a first portion 12a, a second portion 12b, and a third portion 12c mechanically attached (i.e., removably or not removably) to buckle structure 7. Harness portion 12 is configured to restrain a lower body portion of a person (e.g., see lower body portion 17b of child 14 in FIG. 2, infra). A lower body portion (e.g., lower body portion 17b in FIG. 2) is defined herein as any portion of a body located below (i.e., in direction 22) a waist section (e.g., see waist section 17 in FIG. 2, infra). Restraint apparatus 1 may additionally comprise an additional retainer apparatus(s) (i.e., not shown and similar to or the same as retainer apparatus 8 comprising braking mechanism 31) slidably attached to adjustable harness strap 4a and adjustable harness strap 4b to provide additional restraint capabilities for restraint apparatus 1.

Figure 2:
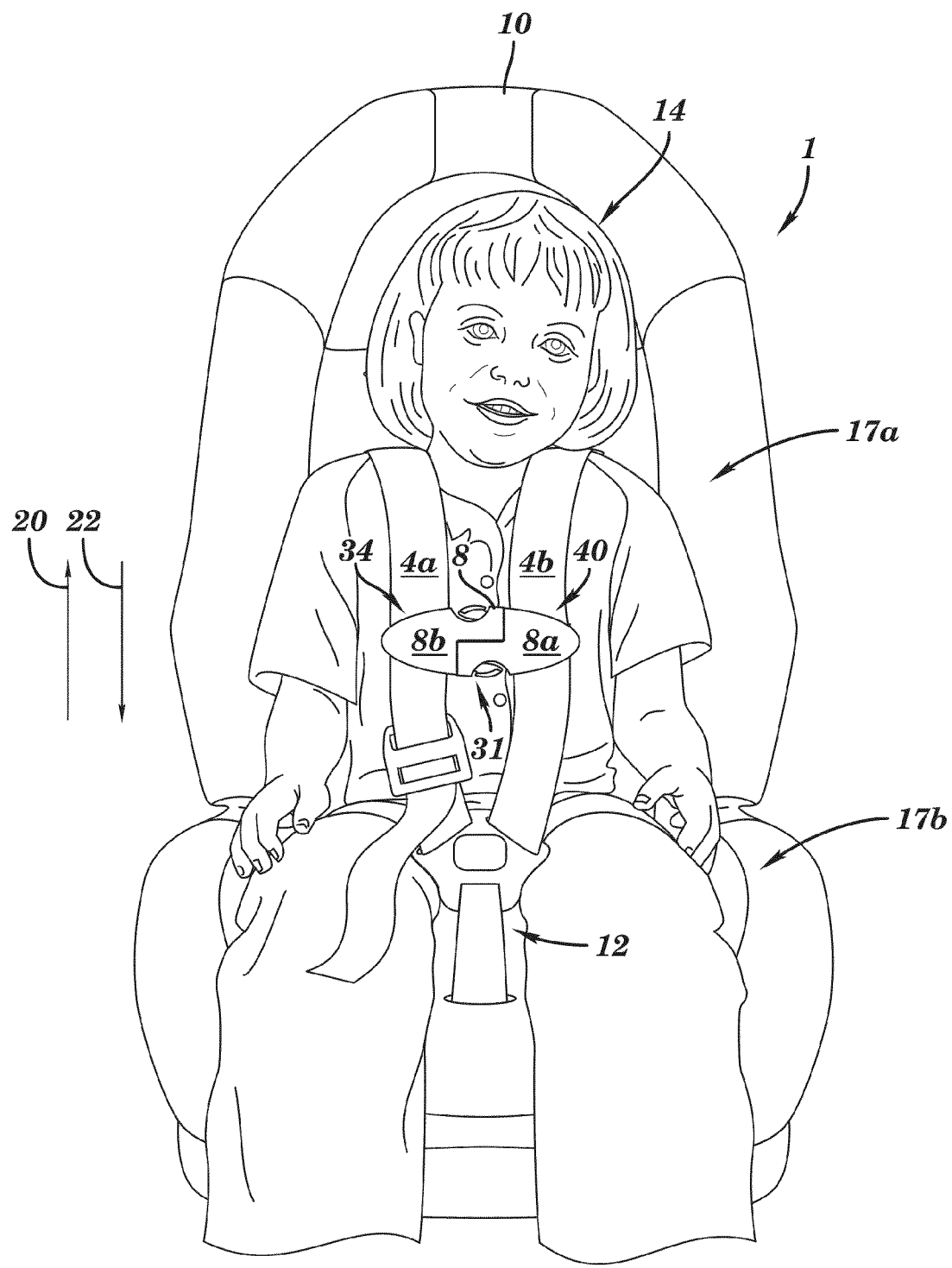
FIG. 2 illustrates the restraint apparatus of FIG. 1 safely restraining an individual during travel in a vehicle, in accordance with embodiments of the present invention.

FIG. 2 illustrates restraint apparatus 1 of FIG. 1 safely restraining an individual 14 during travel in a vehicle, in accordance with embodiments of the present invention. Individual 14 comprises a waist section 17 used to define an upper body portion 17a and a lower body portion 17b.

FIG. 3 illustrates a close up view of retainer apparatus 8 of FIG. 1 slidably attached to adjustable harness strap 4a and adjustable harness strap 4b, in accordance with embodiments of the present invention. In FIG. 3, retainer portion 8a is disconnected from retainer portion 8b. Retainer portion 8a is disconnected from retainer portion 8b by disabling using clips 11a and 11b from openings 15a and 15b, respectively.

Retainer portion 8a is moved towards retainer portion 8b in a direction 60 and retainer portion 8b is moved towards retainer portion 8a in a direction 61 in order to latch clip 11b to opening 15a and latch clip 11a to opening 15b (i.e., as illustrated in FIG. 4, infra). FIG. 3 additionally illustrates a close up view of braking mechanism 31 (i.e., comprising braking mechanism portions 31a and 31b), optional motion detector sensor/alarm apparatus 40 (i.e., comprising motion detector sensor/alarm apparatus portions 40a and 40b), and optional electrical motor/signal receiving device 34 (i.e., comprising electrical motor/signal receiving device portions 34a and 34b). Each of braking mechanism portion 31a, motion detector sensor/alarm apparatus portion 40a, and electrical motor/signal receiving device portion 34a is mechanically attached to retainer portion 8a. Each of braking mechanism portion 31b, motion detector sensor/alarm apparatus portion 40b, and electrical motor/signal receiving device portion 34b is mechanically attached to retainer portion 8b.

FIG. 4A illustrates an alternative to FIG. 3, in accordance with embodiments of the present invention. In contrast to FIG. 3, FIG. 4A illustrates retainer portion 8a removably attached to retainer portion 8b using clips 11a and 11b removably attached to openings 15a and 15b. Additionally, FIG. 4 illustrates cut away line 5A-5A applicable to the cross sectional views of FIGS. 4B-4D as described infra.

Figure 4B:
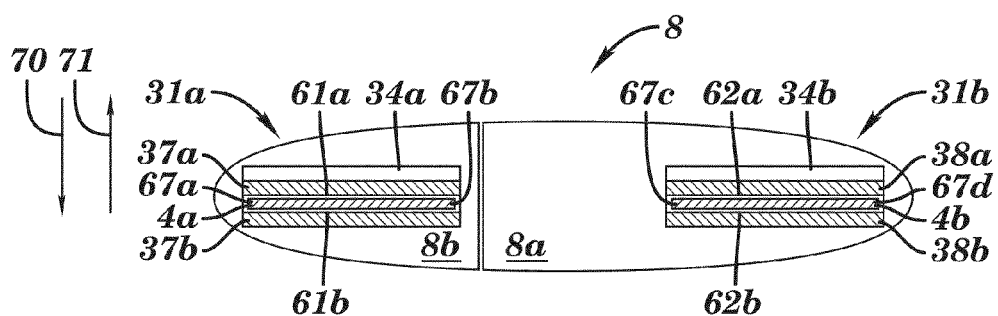
FIG. 4B illustrates a cross sectional view of the retainer apparatus of FIG. 4A, in accordance with embodiments of the present invention.

FIG. 4B illustrates a cross sectional view of retainer apparatus 8 taken at cut away line 5A-5A of FIG. 4A, in accordance with embodiments of the present invention. FIG. 4B illustrates a cross sectional view of retainer portions 8a and 8b, braking mechanism portions 31a and 31b, electrical motor/signal receiving device portions 34a and 34b, and adjustable harness straps 4a and 4b. Braking mechanism portion 31a comprises a first section 37a and a second section 37b. In order to engage braking mechanism portion 31a, first section 37a is moved in direction 70 until contact is made with surface 61a of adjustable harness strap 4a and second section 37b is moved in direction 71 until contact is made with surface 61b of adjustable harness strap 4a. First section 37a is locked to second section 37b (i.e., upon contact with adjustable harness strap 4a to prevent movement of retainer portion 8b) using any means including, inter alia, clips, locking devices, screws, spring loaded latches (e.g., as described with respect to FIG. 4C, infra), magnetic means, an electro/mechanical device such as a solenoid or an electrical motor, etc. Additionally, first section 37a, surface 61a, second section 37b, and/or surface 61b may each include a frictional material (e.g., sandpaper type material, rubber, teeth (e.g., as illustrated in FIG. 4D, infra), etc) to create friction and cause resistance to movement. Alternatively, first section 37a, surface 61a, second section 37b, and/or surface 61b may each include a magnetic material (e.g., standard magnetic material, electromagnetic structure such as an electromagnet, etc) to cause resistance to movement. The aforementioned contact and locking process causes a resistance to movement between adjustable harness strap 4a (i.e., on any portion of adjustable harness strap 4a such as edge sections 67a and 67b or any surface of adjustable harness strap 4a) and braking mechanism portion 31a thereby holding (or locking) retainer portion 8b in a stationary position at a user selected location anywhere on adjustable harness strap 4a. Braking mechanism portion 31b comprises a first section 38a and a second section 38b. In order to engage braking mechanism portion 31b, first section 38a is moved in direction 70 until contact is made with surface 62a of adjustable harness strap 4b and second section 38b is moved in direction 71 until contact is made with surface 62b of adjustable harness strap 4b. First section 38a is locked to second section 38b (i.e., upon contact with adjustable harness strap 4b to prevent movement of retainer portion 8a) using any means including, inter alia, clips, locking devices, screws, spring loaded latches (e.g., as described with respect to FIG. 4C, infra), magnetic means, a solenoid, etc. Additionally, first section 38a, surface 62a, second section 38b, and/or surface 62b may each include a frictional material (e.g., sandpaper type material, rubber, teeth (e.g., as illustrated in FIG. 4D, infra), etc) to create friction and cause resistance to movement. Alternatively, first section 38a, surface 62a, second section 38b, and/or surface 62b may each include a magnetic material (e.g., standard magnetic material, electromagnetic structure, etc) to cause resistance to movement. The aforementioned contact and locking process causes a resistance to movement between adjustable harness strap 4b (i.e., on any portion of adjustable harness strap 4b such as edge sections 67c and 67d or any surface of adjustable harness strap 4b) and braking mechanism portion 31b thereby holding (or locking) retainer portion 8a in a stationary position at user selected location anywhere on adjustable harness strap 4b.

Figure 4C:
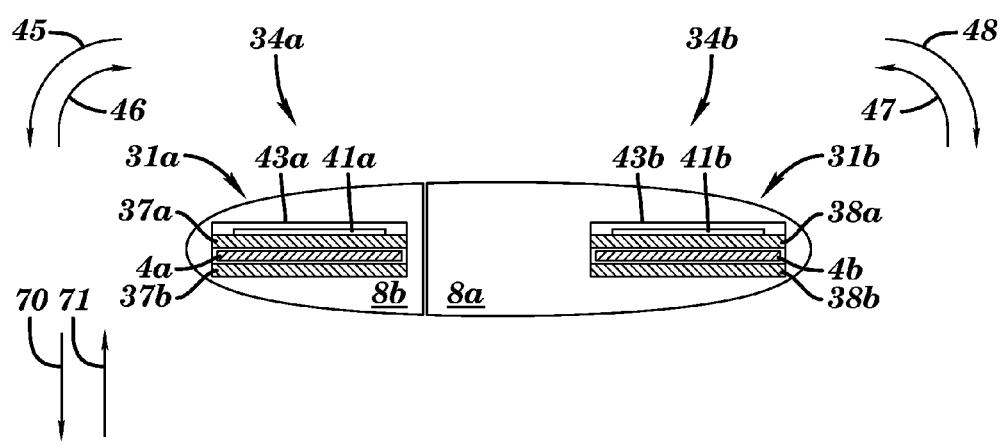
FIG. 4C illustrates a first alternative cross sectional view of the retainer apparatus of FIG. 4B, in accordance with embodiments of the present invention.
Figure 4D:
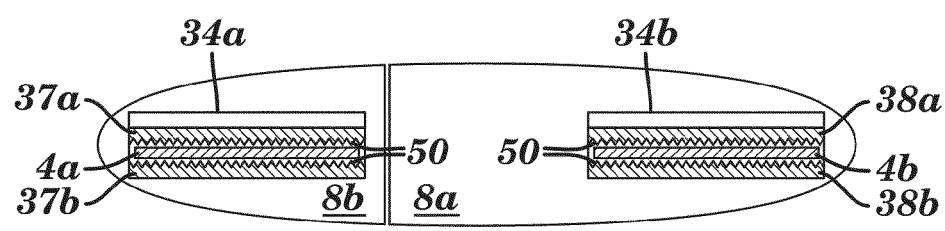
FIG. 4D illustrates a second alternative cross sectional view of the retainer apparatus of FIG. 4B, in accordance with embodiments of the present invention.

FIG. 4C illustrates a first alternative cross sectional view of retainer apparatus 8 of FIG. 4B taken at cut away line 5A-5A of FIG. 4A, in accordance with embodiments of the present invention. In contrast to FIG. 4B, braking mechanism portion 31a comprises a latch (compression) mechanism 43a and a spring assembly 41a and braking mechanism portion 31b comprises a latch (compression) mechanism 43b, and a spring assembly 41b. Latch mechanism 43a and spring 41a (i.e., compressed) are used to lock (or latch) first section 37a to second section 37b (i.e., as illustrated in FIG. 4C). In order to release first section 37a from second section 37b, latch mechanism 43a is disengaged from braking mechanism portion 31a and moved in a direction 46 thereby relieving pressure on first section 37a and second section 37b (and spring 41a). As latch mechanism 43a is moved in direction 46, compressed spring 41a is decompressed aiding in movement of latch mechanism 43a (in direction 46) and relieving pressure on first section 37a and second section 37b. The aforementioned process enables retainer portion 8b to slidably move along adjustable harness strap 4a. In order to lock or latch first section 37a to second section 37b (and enable braking mechanism portion 31a), latch mechanism 43a is moved in a direction 45 and locked to braking mechanism portion 31a thereby enabling pressure on first section 37a and second section 37b (and spring 41a). Latch mechanism 43b and spring 41b (i.e., compressed) are used to lock (or latch) first section 38a to second section 38b (i.e., as illustrated in FIG. 4C). In order to release first section 38a from second section 38b, latch mechanism 43b, is disengaged from braking mechanism portion 31b and moved in a direction 47 thereby relieving pressure on first section 38a and second section 38b (and spring 41b). As latch mechanism 43b is moved in direction 47, compressed spring 41b is decompressed aiding in movement of latch mechanism 43b (in direction 47) and relieving pressure on first section 38a and second section 38b. The aforementioned process enables retainer portion 8a to slidably move along adjustable harness strap 4b. In order to lock or latch first section 38a to second section 38b (and enable braking mechanism portion 31b), latch mechanism 43b is moved in a direction 48 and locked to braking mechanism portion 31b thereby enabling pressure on first section 38a and second section 38b (and spring 41b).

FIG. 4D illustrates a second alternative cross sectional view of retainer apparatus 8 of FIG. 4B taken at cut away line 5A-5A of FIG. 4A, in accordance with embodiments of the present invention. In contrast to FIG. 4B, first section 37a and/or second section 37b of braking mechanism portion 31a each comprise teeth (or any other type of gripping structure) to lock first section 37a and second section 37b to adjustable harness strap 4a to prevent movement of retainer portion 8b. Additionally, first section 38a and/or second section 38b of braking mechanism portion 31b each comprise teeth (or any other type of gripping structure) to lock first section 38a and second section 38b to adjustable harness strap 4b to prevent movement of retainer portion 8a.

Figure 5A:
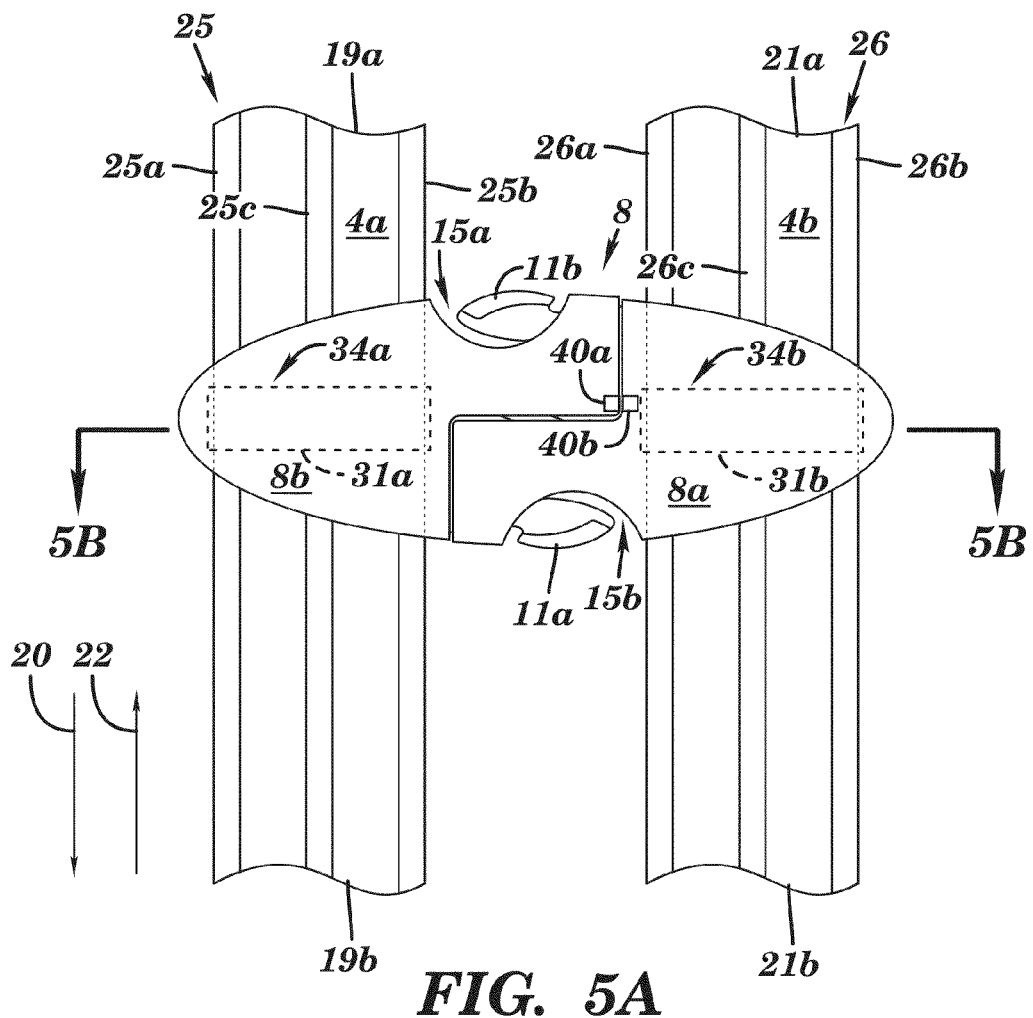
FIG. 5A illustrates an alternative to FIG. 4A, in accordance with embodiments of the present invention.

FIG. 5A illustrates an alternative to FIG. 4A, in accordance with embodiments of the present invention. In contrast to FIG. 4A, adjustable harness strap 4a comprises a track apparatus 25 that includes tracks 25a-25c and adjustable harness strap 4b comprises a track apparatus 26 that includes tracks 26a-26c. Note that although FIG. 5A illustrates track apparatus 25 comprising three tracks (tracks 25a-25c) and track apparatus 26 comprising three tracks (tracks 26a-26c), any number of tracks may be used. Track apparatus 25 enables retainer portion 8b to move along adjustable harness strap 4a (and tracks 25a-25c). In order to disable movement of retainer portion 8b, braking mechanism portion 31a is enabled to cause resistance to movement between tracks 25a-25c and braking mechanism 31a (e.g., braking mechanism comprises braking portions that grab tracks 25a-25c) thereby holding (or locking) retainer portion 8b in a stationary position at a user selected location anywhere on adjustable harness strap 4a. Track apparatus 25 additionally enables electrical motor/signal receiving device portion 34a (i.e., an electrical motor portion) to ride along tracks 25a-25c upon receiving a user command (i.e., for automatically adjusting a position of retainer portion 8b). Electrical motor/signal receiving device portion 34a (i.e., an electrical motor portion) may additionally be disabled to cause resistance to movement between tracks 25a-25c and electrical motor/signal receiving device portion 34a to hold (or lock) retainer portion 8b in a stationary position at a user selected location anywhere on adjustable harness strap 4a (i.e., in addition to or instead of using braking mechanism portion 31a). Track apparatus 26 enables retainer portion 8a to move along adjustable harness strap 4b (and tracks 26a-26c). In order to disable movement of retainer portion 8a, braking mechanism portion 31b is enabled to cause resistance to movement between tracks 26a-26c and braking mechanism 31b (e.g., braking mechanism comprises braking portions that grab tracks 26a-26c) thereby holding (or locking) retainer portion 8a in a stationary position at a user selected location anywhere on adjustable harness strap 4b. Track apparatus 26 additionally enables electrical motor/signal receiving device portion 34b (i.e., an electrical motor portion) to ride along tracks 26a-26c upon receiving a user command (i.e., for automatically adjusting a position of retainer portion 8a). Electrical motor/signal receiving device portion 34b (i.e., an electrical motor portion) may additionally be disabled to cause resistance to movement between tracks 26a-26c and electrical motor/signal receiving device portion 34b to hold (or lock) retainer portion 8a in a stationary position at a user selected location anywhere on adjustable harness strap 4b (i.e., in addition to or instead of using braking mechanism portion 31b). Tracks 25a-25c and 26a-26c may comprise any type of or shaped track including, inter alia, vertical type tracks, rectangular shaped tracks, triangular shaped tracks, circular shaped tracks, a zipper type track, etc. Tracks 25a-25c and 26a-26c may comprise any type of material including, inter alia, plastic, metal, magnetic, a frictional material, etc. Additionally, FIG. 5A illustrates cut away line 5B-5B applicable to the cross sectional view of FIG. 5B as described, infra.

Figure 5B:
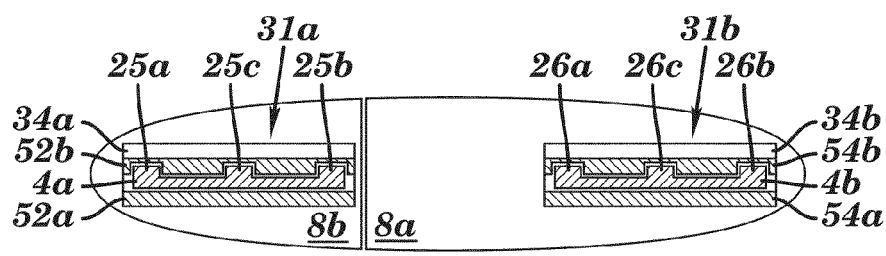
FIG. 5B illustrates a cross sectional view of the retainer apparatus of FIG. 5A, in accordance with embodiments of the present invention.

FIG. 5B illustrates a cross sectional view of retainer apparatus 8 taken at cut away line 5B-5B of FIG. 5A, in accordance with embodiments of the present invention. FIG. 5B illustrates a cross sectional view of retainer portions 8a and 8b, braking mechanism portions 31a and 31b, electrical motor/signal receiving device portions 34a and 34b, tracks 25a-25c and 26a-26c, and adjustable harness straps 4a and 4b. Braking mechanism portion 31a comprises a first section 52a and a second section 52b. In order to engage braking mechanism portion 31a, second section 52b (i.e., comprising braking devices on vertical sections of second section 52b) is enabled such that pressure is applied (i.e., by the braking devices (e.g., spring loaded braking devices, solenoid driven braking devices, etc) on vertical sections of second section 52b) to vertical sections of each of tracks 25a-25c thereby causing a resistance to movement between tracks 25a-25c (of adjustable harness strap 4a) and braking mechanism portion 31a (i.e., the braking devices on vertical sections of second section 52b) thereby holding (or locking) retainer portion 8b in a stationary position at a user selected location anywhere on adjustable harness strap 4a. Alternatively, second section 52b may comprise magnetic structures (e.g., electro/magnetic structures) on vertical sections of second section 52b and tracks 25a-25c comprise a metallic material capable of attraction to a magnetic field. In this case, engaging braking mechanism portion 31a includes enabling the electro/magnetic structures on vertical sections of second section 52b to generate a magnetic field thereby causing the electro/magnetic structures to magnetically hold the electro/magnetic structures to tracks 25a-25c. The aforementioned process holds (or locks) retainer portion 8b in a stationary position at a user selected location anywhere on adjustable harness strap 4a. Braking mechanism portion 31b comprises a first section 54a and a second section 54b. In order to engage braking mechanism portion 31b, second section 54b (i.e., comprising braking devices (e.g., spring loaded braking devices, solenoid driven braking devices, etc) on vertical sections of second section 54b) is enabled such that pressure is applied (i.e., by the braking devices on vertical sections of second section 54b) to vertical sections of each of tracks 26a-26c thereby causing a resistance to movement between tracks 26a-26c (of adjustable harness strap 4b) and braking mechanism portion 31b (i.e., the braking devices on vertical sections of second section 54b) thereby holding (or locking) retainer portion 8a in a stationary position at a user selected location anywhere on adjustable harness strap 4b. Alternatively, second section 54b may comprise magnetic structures (e.g., electro/magnetic structures) on vertical sections of second section 54b and tracks 26a-26c comprise a metallic material capable of attraction to a magnetic field. In this case, engaging braking mechanism portion 31b includes enabling the electro/magnetic structures on vertical sections of second section 54b to generate a magnetic field thereby causing the electro/magnetic structures to magnetically hold the electro/magnetic structures to tracks 26a-26c. The aforementioned process holds (or locks) retainer portion 8a in a stationary position at a user selected location anywhere on adjustable harness strap 4b.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A harness apparatus comprising:
a first adjustable harness strap;
a second adjustable harness strap; and
a first retainer apparatus comprising a first retainer portion slidably attached to said first adjustable harness strap, a second retainer portion slidably attached to said second adjustable harness strap, and a braking mechanism configured to prevent said first retainer portion and said second retainer portion from moving along said first adjustable harness strap and said second adjustable harness strap, wherein said first retainer portion is removably attached to said second retainer portion, and wherein said braking mechanism comprises a braking device configured to apply resistance to said first adjustable harness strap and said second adjustable harness strap and to hold said first retainer apparatus in a first stationary position along said first adjustable harness strap and said second adjustable harness strap, wherein said first adjustable harness strap comprises a first magnetic strip comprising a first magnetic material mechanically attached to a first strap, wherein said second adjustable harness strap comprises a second magnetic strip comprising a second magnetic material mechanically attached to a second strap, wherein said braking device comprises a first magnetic mechanism mechanically attached to said first retainer portion and a second magnetic mechanism mechanically attached to said second retainer portion, wherein said first magnetic mechanism is configured to apply a first magnetic field to magnetize said first magnetic material in said first magnetic strip to enable said holding said first retainer apparatus in said stationary position along said first harness strap, and wherein said second magnetic mechanism is configured to apply a second magnetic field to magnetize said second magnetic material in said second magnetic strip to enable said holding said second retainer apparatus in said stationary position along said second harness strap.

2. The harness apparatus of claim 1, wherein said first magnetic mechanism comprises a first electromagnet, and wherein said second magnetic mechanism comprises a second electromagnet.

3. The harness apparatus of claim 1, wherein said harness apparatus is mechanically attached to a car seat, and wherein said harness apparatus is configured to restrain a user and prevent said user from being ejected from said car seat.

4. The harness apparatus of claim 1, wherein said first retainer apparatus further comprises a sensor and an alarm, wherein said sensor is configured to detect movement of said first retainer apparatus, wherein said alarm is configured to alert a user if said movement of said first retainer apparatus is detected, and wherein said movement is selected from the group consisting of said moving along said first adjustable harness strap and said second adjustable harness strap and movement caused by said first retainer portion being disconnected from said second retainer portion.

5. A harness apparatus comprising:
a first adjustable harness strap;
a second adjustable harness strap; and
a first retainer apparatus comprising a first retainer portion slidably attached to said first adjustable harness strap, a second retainer portion slidably attached to said second adjustable harness strap, and a braking mechanism configured to prevent said first retainer portion and said second retainer portion from moving along said first adjustable harness strap and said second adjustable harness strap, wherein said first retainer portion is removably attached to said second retainer portion, and wherein said braking mechanism comprises a braking device configured to apply resistance to said first adjustable harness strap and said second adjustable harness strap and to hold said first retainer apparatus in a first stationary position along said first adjustable harness strap and said second adjustable harness strap, wherein said braking mechanism further comprises an electro/mechanical device configured to apply mechanical pressure to said braking device.

6. The harness apparatus of claim 5, wherein said electro/mechanical device comprises a device selected from the group consisting of a solenoid and an electrical motor.

7. The harness apparatus of claim 5, wherein said harness apparatus is mechanically attached to a car seat, and wherein said harness apparatus is configured to restrain a user and prevent said user from being ejected from said car seat.

8. The harness apparatus of claim 5, wherein said first retainer apparatus further comprises a sensor and an alarm, wherein said sensor is configured to detect movement of said first retainer apparatus, wherein said alarm is configured to alert a user if said movement of said first retainer apparatus is detected, and wherein said movement is selected from the group consisting of said moving along said first adjustable harness strap and said second adjustable harness strap and movement caused by said first retainer portion being disconnected from said second retainer portion.

9. The harness apparatus of claim 5, wherein said braking device comprises a first braking device section mechanically attached to said first retainer portion and a second braking device section mechanically attached to said second retainer portion, wherein said first braking device section comprises a first friction mechanism configured to apply said resistance to said first adjustable harness strap, and wherein said second braking device section comprises a second friction mechanism configured to apply said resistance to said second adjustable harness strap.

10. The harness apparatus of claim 9, wherein said first friction mechanism comprises mechanical teeth for applying said resistance to said first adjustable harness strap, and wherein said second friction mechanism comprises mechanical teeth for applying said resistance to said second adjustable harness strap.

11. The harness apparatus of claim 9, wherein said first friction mechanism comprises a friction material selected from the group consisting of sand paper material and rubber, and wherein said second friction mechanism comprises a friction material selected from the group consisting of sand paper material and rubber.

12. The harness apparatus of claim 5, wherein said first adjustable harness strap comprises a frictional material on a first surface of said first adjustable harness strap, and wherein said second adjustable harness strap comprises said frictional material on a first surface of said second adjustable harness strap.

13. A harness apparatus comprising:
a first adjustable harness strap;
a second adjustable harness strap; and
a first retainer apparatus comprising a first retainer portion slidably attached to said first adjustable harness strap, a second retainer portion slidably attached to said second adjustable harness strap, and a braking mechanism configured to prevent said first retainer portion and said second retainer portion from moving along said first adjustable harness strap and said second adjustable harness strap, wherein said first retainer portion is removably attached to said second retainer portion, wherein said braking mechanism comprises a braking device configured to apply resistance to said first adjustable harness strap and said second adjustable harness strap and to hold said first retainer apparatus in a first stationary position along said first adjustable harness strap and said second adjustable harness strap, wherein said first retainer apparatus further comprises an electrical motor and a signal receiving device, wherein said electrical motor is configured to slidably move said first retainer apparatus along said first adjustable harness strap and said second adjustable harness strap, wherein said signal receiving device is configured to receive a control signal from a control device, and wherein said control signal is configured to command said electrical motor to slidably move said first retainer apparatus along said first adjustable harness strap and said second adjustable harness strap.

14. The harness apparatus of claim 13, wherein said harness apparatus is mechanically attached to a car seat, and wherein said harness apparatus is configured to restrain a user and prevent said user from being ejected from said car seat.

15. The harness apparatus of claim 13, wherein said first retainer apparatus further comprises a sensor and an alarm, wherein said sensor is configured to detect movement of said first retainer apparatus, wherein said alarm is configured to alert a user if said movement of said first retainer apparatus is detected, and wherein said movement is selected from the group consisting of said moving along said first adjustable harness strap and said second adjustable harness strap and movement caused by said first retainer portion being disconnected from said second retainer portion.

16. The harness apparatus of claim 13, wherein said electrical motor is configured to slidably move said first retainer apparatus along said first adjustable harness strap and said second adjustable harness strap until a disable control signal is received by said signal receiving device.

17. The harness apparatus of claim 13, wherein said electrical motor is configured to slidably move, a specified distance, said first retainer apparatus along said first adjustable harness strap and said second adjustable harness strap.

18. The harness apparatus of claim 17, wherein said first retainer apparatus comprises a memory structure, and wherein said memory structure comprises data indicating said specified distance.

19. The harness apparatus of claim 17, wherein data indicating said specified distance is received from a memory structure comprised by a computer within a vehicle.

* * * * *